United States Patent
Rowe (10) Patent No.: US 10,859,101 B2
(45) Date of Patent: Dec. 8, 2020

(54) SOFT-BODIED ACTUATOR WITH PINCHED CONFIGURATION

(71) Applicant: Toyota Motor Engineering & Manufacturing North America, Inc., Plano, TX (US)

(72) Inventor: Michael Paul Rowe, Pinckney, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 36 days.

(21) Appl. No.: 16/214,837

(22) Filed: Dec. 10, 2018

(65) Prior Publication Data

US 2020/0182269 A1 Jun. 11, 2020

(51) Int. Cl.
*F15B 15/08* (2006.01)
*F15B 15/10* (2006.01)
*F15B 15/20* (2006.01)

(52) U.S. Cl.
CPC ............ *F15B 15/088* (2013.01); *F15B 15/10* (2013.01); *F15B 2015/208* (2013.01); *F15B 2211/426* (2013.01); *F15B 2211/6653* (2013.01)

(58) Field of Classification Search
CPC ...... F15B 15/088; F15B 15/10; F15B 15/103; F15B 2015/206; F15B 2015/208
(Continued)

(56) References Cited

U.S. PATENT DOCUMENTS

| 2,241,086 A | 1/1939 | Gould |
| 4,319,427 A | 3/1982 | Way, Jr. |

(Continued)

FOREIGN PATENT DOCUMENTS

| JP | 2007097292 A | 4/2007 |
| KR | 20050056526 A | 6/2005 |

(Continued)

OTHER PUBLICATIONS

Knoss, "Next-gen flexible robots move and heal like us," CU Bouldrer Today, Jan. 4, 2018, retrieved from the Internet: <https://www.colorado.edu/today/2018/01/04/next-gen-flexible-robots-move-and-heal-us>, [retrieved Mar. 30, 2018] (6 pages).

(Continued)

*Primary Examiner* — Michael Leslie
(74) *Attorney, Agent, or Firm* — Christopher G. Darrow; Darrow Mustafa PC (57) ABSTRACT

A soft-bodied actuator can be configured to be in a pinched or contracted configuration when power is not supplied to the actuator. Thus, a supply of electrical energy is not needed to maintain the actuator in the pinched or contracted configuration. The actuator can include a central bladder. The central bladder can include a flexible casing that defines a central fluid chamber. The central fluid chamber can include a dielectric fluid. A first conductor and a second conductor can be operatively connected to opposite portions of the central bladder. The actuator can be configured such that, in the activated mode, the first and second conductors receive electrical energy from a power source such that they are like charged, causing the first and second conductors to repel each other. The central fluid chamber can include a particulate material to help maintain the central bladder in the pinched configuration.

20 Claims, 4 Drawing Sheets

(58) Field of Classification Search
USPC .......................................................... 92/92
See application file for complete search history.

(56) References Cited

U.S. PATENT DOCUMENTS

| | | | |
|---|---|---|---|
| 6,065,978 A | 5/2000 | Dehan et al. | |
| 6,215,221 B1 | 4/2001 | Cabuz et al. | |
| 6,490,960 B1 | 12/2002 | Jackson et al. | |
| 6,685,442 B2 | 2/2004 | Chinn et al. | |
| 6,939,291 B2 | 9/2005 | Jay | |
| 7,353,747 B2 * | 4/2008 | Swayze .................. | F04B 43/08 92/92 |
| 7,484,735 B2 | 2/2009 | Verbrugge et al. | |
| 7,673,562 B2 | 3/2010 | Pattekar et al. | |
| 7,892,630 B1 | 2/2011 | McKnight et al. | |
| 7,901,524 B1 | 3/2011 | McKnight et al. | |
| 7,905,538 B2 | 3/2011 | Ukpai et al. | |
| 8,222,799 B2 | 7/2012 | Polyakov et al. | |
| 8,240,677 B2 | 8/2012 | Browne et al. | |
| 8,272,392 B2 | 9/2012 | Pattekar et al. | |
| 8,430,810 B2 | 4/2013 | Hassidov et al. | |
| 8,863,608 B2 | 10/2014 | Fischer et al. | |
| 9,061,118 B2 | 6/2015 | Shoham et al. | |
| 9,764,113 B2 | 9/2017 | Tuval et al. | |
| 9,790,968 B2 | 10/2017 | Yang et al. | |
| 10,058,647 B2 * | 8/2018 | Roche .................. | F15B 15/103 |
| 10,293,718 B1 | 5/2019 | Ilievski et al. | |
| 2004/0107829 A1 | 6/2004 | Davis et al. | |
| 2004/0261411 A1 | 12/2004 | MacGregor | |
| 2005/0198904 A1 | 9/2005 | Browne et al. | |
| 2005/0206096 A1 | 9/2005 | Browne et al. | |
| 2006/0038745 A1 | 2/2006 | Naksen et al. | |
| 2007/0046074 A1 | 3/2007 | Satta et al. | |
| 2007/0246898 A1 | 10/2007 | Keefe et al. | |
| 2009/0086331 A1 | 4/2009 | Gunasekaran et al. | |
| 2009/0115285 A1 | 5/2009 | Najafi et al. | |
| 2010/0258362 A1 | 10/2010 | Trimmer | |
| 2011/0188258 A1 | 8/2011 | Tajima | |
| 2012/0287493 A1 | 11/2012 | Kuhlman et al. | |
| 2013/0304049 A1 | 11/2013 | Behnke, II et al. | |
| 2013/0318962 A1 | 12/2013 | Joshi et al. | |
| 2015/0331156 A1 | 11/2015 | Hirsa | |
| 2016/0106620 A1 | 4/2016 | Uno et al. | |
| 2017/0150252 A1 | 5/2017 | Trestain et al. | |
| 2018/0036198 A1 | 2/2018 | Mergl et al. | |
| 2018/0339624 A1 | 11/2018 | Leck | |
| 2019/0023161 A1 | 1/2019 | Sullivan et al. | |
| 2019/0032684 A1 | 1/2019 | Kowalewski et al. | |
| 2019/0059608 A1 | 2/2019 | Yan et al. | |
| 2019/0232822 A1 | 8/2019 | Hintermaier | |
| 2019/0296217 A1 * | 9/2019 | Jung ..................... | F15B 15/088 |
| 2020/0032822 A1 * | 1/2020 | Keplinger ............... | F15B 15/10 |

FOREIGN PATENT DOCUMENTS

| | | |
|---|---|---|
| WO | 2017077541 A1 | 5/2017 |
| WO | 2018175741 A1 | 9/2018 |

OTHER PUBLICATIONS

Acome et al., "Hydraulically Amplified Self-Healing Electrostatic Actuators with Muscle-Like Performance," Science, vol. 359, Issue 6371, pp. 61-65 (Jan. 5, 2018) (6 pages).

Yang et al., "Novel Design and Three-Dimensional Printing of Variable Stiffness Robotic Grippers," Dec. 2016, ASME Journal of Mechanisms and Robotics, vol. 8, pp. 061010-1 to 061010-15 (15 pages).

SMC TECH, "Precision Regulator. Series IR1000/2000/3000", SMC Tech, pp. 713-725 and 1-19, 2015 (53 pages).

* cited by examiner

SOFT-BODIED ACTUATOR WITH PINCHED CONFIGURATION

FIELD

The subject matter described herein relates in general to actuators and, more particularly, to soft-bodied actuators.

BACKGROUND

Actuators are used in a wide-variety of applications for interacting with and/or controlling another component or system. There are various types of actuators, including hydraulic actuators, pneumatic actuators, electric, and mechanical actuators. Many actuators in the past have been made of rigid materials or include rigid structures. However, there have been new advancements in the field of soft-bodied actuators. One example of a recent development relates to what is being referred to as hydraulically amplified self-healing electrostatic actuators.

SUMMARY

In one respect, the subject matter presented herein is directed to an actuator. The actuator includes a central bladder. The central bladder includes a flexible casing and defines a central fluid chamber. The central fluid chamber includes a dielectric fluid. A first conductor can be operatively connected to a first portion of the central bladder, and a second conductor can be operatively connected to a second portion of the central bladder opposite the first portion. The first conductor and the second conductor can be operatively connected to receive electrical energy from a power source. The actuator can be configured such that the central bladder is in a pinched configuration in a non-activated mode in which electrical energy is not supplied to the first and second conductors. The actuator can be configured such that the central bladder is in a non-pinched configuration in an activated mode in which electrical energy is supplied to the first and second conductors.

In another respect, the subject matter presented herein is directed to a system. The system includes an actuator, a power source, and one or more processors. The one or more processors are operatively connected to selectively control a supply of electrical energy from the power source to the actuator. The actuator includes a central bladder. The central bladder can include a flexible casing and can define a central fluid chamber. The central fluid chamber can include a dielectric fluid. The actuator can include a first conductor and a second conductor operatively positioned on opposite portions of central bladder. The power source can be operatively connected to supply electrical energy to the first conductor and the second conductor. The actuator can be configured such that the central bladder is in a pinched configuration in a non-activated mode in which electrical energy from the power source is not supplied to the first and second conductors. The actuator can be configured such that the central bladder is in a non-pinched configuration in an activated mode in which electrical energy is supplied to the first and second conductors.

In still another respect, the subject matter presented herein is directed to an actuator. The actuator includes a central bladder, a first outer bladder, and a second outer bladder. The first outer bladder and the second outer bladder can be located on opposite portions of the central bladder. The central bladder includes a flexible casing that defines a central fluid chamber. The central fluid chamber can include a dielectric fluid. A first conductor can be operatively connected to a first portion of the central bladder, and a second conductor can be operatively connected to a second portion of the central bladder opposite the first portion. The first and second conductors can be separated by the central bladder. The first conductor and the second conductor can be operatively connected to receive electrical energy from a power source. The first outer bladder can include a flexible casing and can define a first outer fluid chamber. The first outer fluid chamber can include a dielectric fluid. A third conductor can be operatively connected to a first portion of the first outer bladder. The first conductor can be operatively connected to a second portion of the first outer bladder opposite the first portion. Thus, the first conductor and the third conductor can be separated by the first outer bladder. The second outer bladder can include a flexible casing and define a second outer fluid chamber. The second outer fluid chamber can include a dielectric fluid. A fourth conductor can be operatively connected to a first portion of the second outer bladder. The second conductor can be operatively connected to a second portion of the second outer bladder opposite the first portion. The second conductor and the fourth conductor can be separated by the second outer bladder.

DETAILED DESCRIPTION

Arrangements described herein are direct to a soft-bodied actuator configured such that it is in a pinched or otherwise contracted configuration when it is not activated. The actuator can be configured such that it is in a non-pinched or expanded configuration when it activated. Such an actuator can be beneficial at least in that a supply of electrical energy is not required to maintain the actuator in a pinched or contracted configuration.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
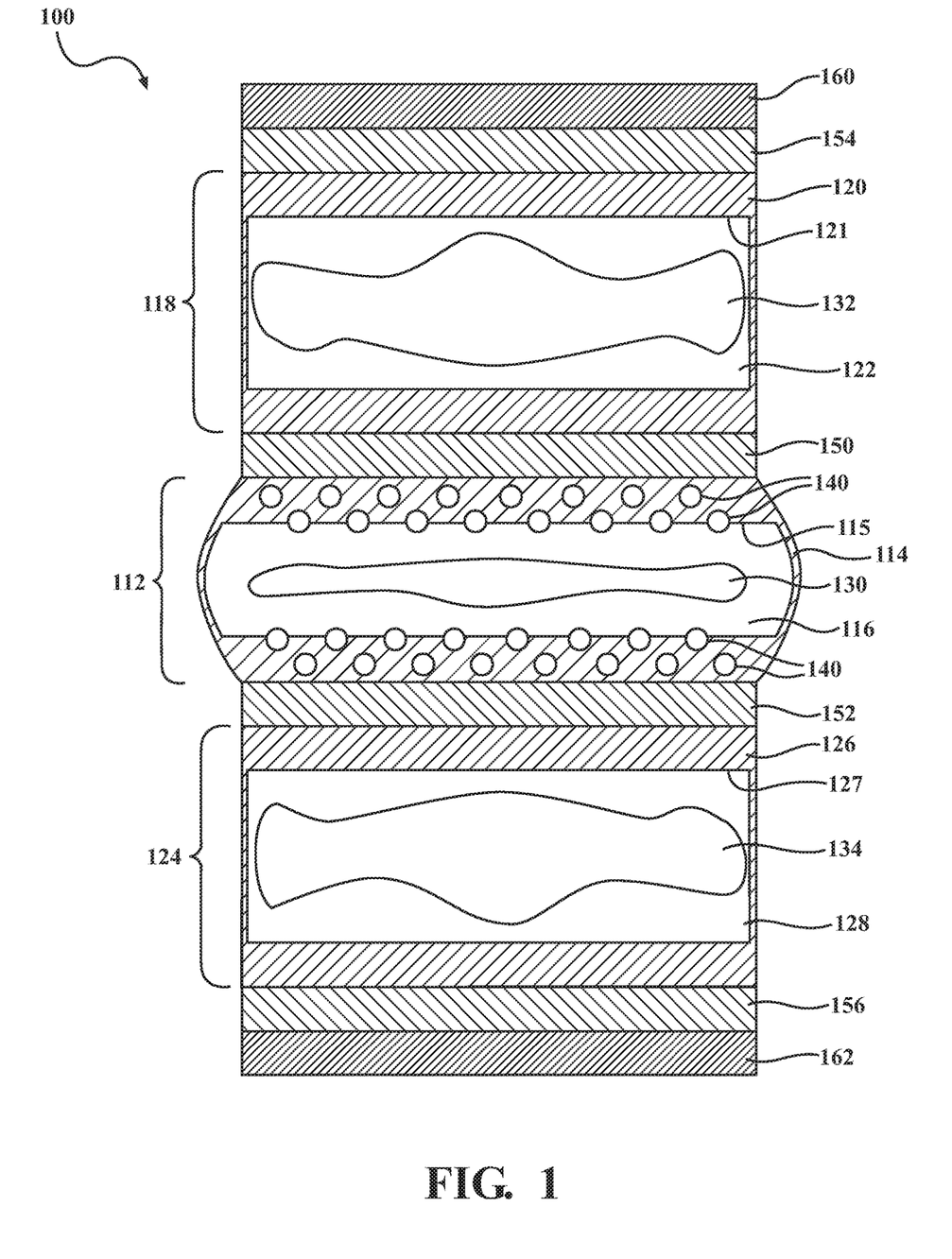
FIG. 1 is a cross-sectional view of an actuator, showing a non-activated mode.
Figure 2:
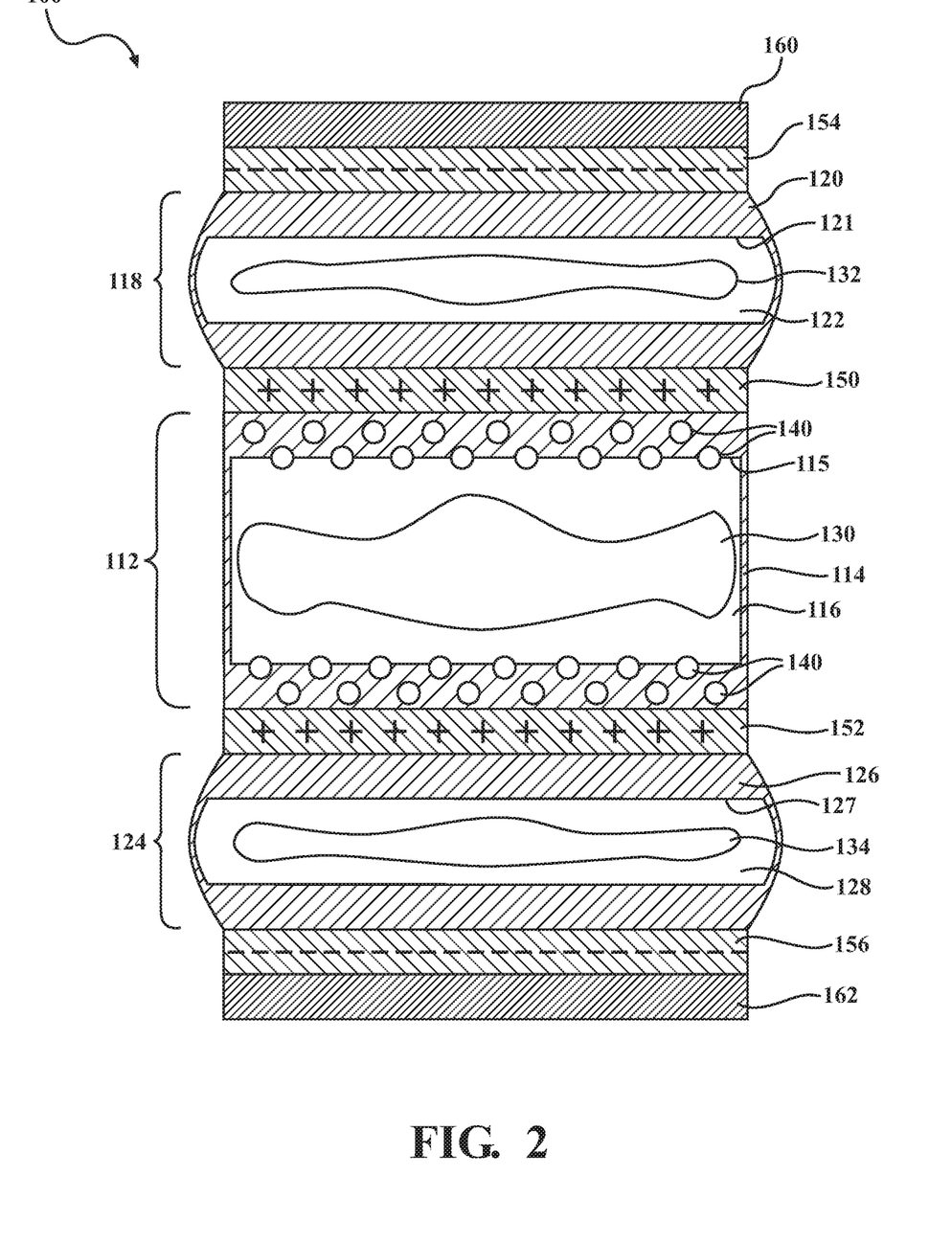
FIG. 2 is a cross-sectional view of the actuator, showing an activated mode.

Referring to FIGS. 1-2, an example of an actuator 100 is shown. The actuator 100 can have a body that is, at least in large part, made of a soft, flexible material.

The actuator 100 can include a central bladder 112. The central bladder 112 can include a central casing 114. The central casing 114 can be made of a single piece of material, or a plurality of separate pieces of material that are joined together. An inner surface 115 of the central casing 114 can define a central fluid chamber 116. In one or more arrangements, the central bladder 112 and/or central fluid chamber 116 can be fluid impermeable.

The central bladder 112 can be made of any suitable material. For example, the central bladder 112 can be made of an insulating material. The insulating material can be flexible. The insulating material can be a polymer and/or an elastomeric polymer (elastomer). The polymers or elastomers can be natural or synthetic in nature. In one or more arrangements, the insulating material can be silicone rubber. Additional examples of the insulating material include nitrile, ethylene propylene diene monomer (EPDM), fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, or combinations thereof.

The actuator 100 can include a first outer bladder 118 and a second outer bladder 124. The first outer bladder 118 and the second outer bladder 124 can be located on opposite sides or portions of the central bladder 112. The first outer bladder 118 and the second outer bladder 124 can be operatively connected to the central bladder 112.

The first outer bladder 118 can include a first casing 120. An inner surface 121 of the first casing 120 can define a first outer fluid chamber 122. In one or more arrangements, the first outer bladder 118 and/or the first outer fluid chamber 122 can be fluid impermeable. The second outer bladder 124 can include a second casing 126. An inner surface 127 of the second casing 126 can define a second outer fluid chamber 128. In one or more arrangements, the second outer bladder 124 and/or the second outer fluid chamber 128 can be fluid impermeable.

The first outer bladder 118 and the second outer bladder 124 can be made of an insulating material. The above discussion of the insulating material in connection with the central bladder 112 applies equally to the first outer bladder 118 and the second outer bladder 124. The first outer fluid chamber 122, the second outer fluid chamber 128, and the central fluid chamber 116 can be made of the same material. Alternatively, at least one of the first outer fluid chamber 122, the second outer fluid chamber 128, and the central fluid chamber 116 can be made of a different material.

The insulating material can have associated strength. In one or more arrangements, the strength of the insulating material defining the central bladder 112 can be greater that the strength of the insulating material defining the first outer bladder 118 and the second outer bladder 124.

The first outer fluid chamber 122, the second outer fluid chamber 128, and the central fluid chamber 116 can have substantially the same size, shape, and/or configuration. Alternatively, one or more of the fluid chambers 116, 122, 128 can have a different size, shape, and/or configuration than the other fluid chambers 116, 122, 128.

A dielectric fluid 130, 132, 134 can be located within the central fluid chamber 116, the first outer fluid chamber 122, and the second outer fluid chamber 128, respectively. The dielectric fluid 130, 132, 134 can be any suitable material. In one or more arrangements, the dielectric fluid 130, 132, 134 can be ethylene glycol. Additional example of the dielectric fluid 130, 132, 134 include transformer oil or mineral oil. In one or more arrangements, the dielectric fluid 130, 132, 134 can be a lipid based fluid, such as a vegetable oil-based dielectric fluid.

The dielectric fluid 130, 132, 134 can have various associated properties. The dielectric fluid 130, 132, 134 can have an associated dielectric constant. In one embodiment, the dielectric fluid 130, 132, 134 can have a dielectric constant of 1 or greater, 2 or greater, 3 or greater, 4 or greater, 5 or greater, 6 or greater, 7 or greater, 8 or greater, 9 or greater, 10 or greater, 20 or greater, 30 or greater, 40 or greater, 50 or greater, or higher.

In one or more arrangements, the dielectric fluid 130, 132, 134 can be a fluid that is resistant to electrical breakdown. In one or more arrangements, the dielectric fluid 130, 132, 134 can provide electrical insulating properties. In one or more arrangements, the dielectric fluid 130, 132, 134 can prevent arcing between surrounding conductors.

In one or more arrangements, the dielectric fluid 132 in the first outer fluid chamber 122, the dielectric fluid 134 in the second outer fluid chamber 128, and dielectric fluid 130 in the central fluid chamber 116 can be the same. In one or more arrangements, the dielectric fluid 130, 132, 134 used in one of the fluid chambers 116, 122, 128 can be different from the dielectric fluid 130, 132, 134 used in one or more of the other fluid chambers 116, 122, 128. For example, the dielectric fluid 130 used in the central fluid chamber 116 can be different from the dielectric fluid 132, 134 used in the first outer fluid chamber 122 and the second outer fluid chamber 128.

A particulate material 140 associated with the central bladder 112. As an example, the particulate material 140 can be at least partially embedded in the central casing 114 at or near the inner surface 115. As another example, the particulate material 140 can be attached to the inner surface 115 in any suitable manner, such as by one or more adhesives. As a further example, the particulate material 140 can, alternatively or in addition, be included in the dielectric fluid 130.

The particulate material 140 can be substantially uniform in size and/or composition. Alternatively, the particulate material 140 can vary size and/or composition. The particulate material 140 can be non-conductive. In one or more arrangements, the particulate material 140 can include particulate glass, silicon dioxide, carbide, sand, and/or grit. The particulate material 140 can make the inner surface 115 of the central fluid chamber 116 rough or coarse. Thus, when opposing portions of the inner surface 115 are brought together (e.g., directly contacting, substantially adjacent, etc.), the particulate material 140 on opposing portions of the inner surface 115 can engage each other, thereby tending to keep the opposing portions of the inner surface 115 together. Such interaction can facilitate the central fluid chamber 116 being maintained in a pinched configuration, as will be explained in greater detail later.

The actuator 100 can include a plurality of conductors. In the example shown in FIGS. 1-2, the actuator can have a first conductor 150, a second conductor 152, a third conductor 154, and a fourth conductor 156. The conductors 150, 152, 154, 156 can conduct electrical energy. The conductors 150, 152, 154, 156 can be made of any suitable material, such as a conductive elastomer. In one or more arrangements, the conductors 150, 152, 154, 156 can be made of natural rubber with carbon or other conductive particles distributed throughout the material. The conductors 150, 152, 154, 156 can be made of the same material as each other, or one or more of the conductors 150, 152, 154, 156 can be made of a different material. One or more of the conductors 150, 152, 154, 156 can be formed by a single, continuous structure, or one or more of the conductors 150, 152, 154, 156 can be formed by a plurality of separate structures.

The first conductor 150 and the second conductor 152 can be located on opposite sides or portions of the central bladder 112. Thus, the first conductor 150 and the second conductor 152 can be separated by the central bladder 112. The first conductor 150 and/or the second conductor 152 can be operatively connected to the central bladder 112 in any suitable manner. As used herein, the term "operatively connected," as used throughout this description, can include direct or indirect connections, including connections without direct physical contact. The first conductor 150 and/or the second conductor 152 may cover all of or a portion of a respective side or portion of the central bladder 112.

The first conductor 150 and the third conductor 154 can be located on opposite sides or portions of the first outer bladder 118. Thus, the first conductor 150 and the third conductor 154 can be separated by the first outer bladder 118. The first conductor 150 and/or the third conductor 154 can be operatively connected to the first outer bladder 118 in any suitable manner. The first conductor 150 and/or the third conductor 154 may cover all of or a portion of a respective side of the first outer bladder 118.

The second conductor 152 and the fourth conductor 156 can be located on opposite sides or portions of the second outer bladder 124. Thus, the second conductor 152 and the fourth conductor 156 can be separated by the second outer bladder 124. The second conductor 152 and/or the fourth conductor 156 can be operatively connected to the second outer bladder 124 in any suitable manner. The second conductor 152 and/or the fourth conductor 156 may cover all of or a portion of a respective side or portion of the second outer bladder 124.

Each of the conductors 150, 152, 154, 156 can be operatively connected to receive electrical energy from a power source. As a result, electrical energy can be selectively supplied to each individual conductors.

The first conductor 150 can be operatively positioned between the central bladder 112 and the first outer bladder 118. In one or more arrangements, the first conductor 150 can be substantially encapsulated by the central bladder 112 and the first outer bladder 118. Also, the second conductor 152 can be operatively positioned between the central bladder 112 and the second outer bladder 124. In one or more arrangements, the second conductor 152 can be substantially encapsulated by the central bladder 112 and the second outer bladder 124.

The third conductor 154 can be operatively positioned between the first outer bladder 118 and a first insulating material 160. The first insulating material 160 can substantially cover the exposed portions of the first conductor 150, such as those portions of the first conductor 150 that are not covered by the first outer bladder 118. The fourth conductor 156 can be operatively positioned between the second outer bladder 124 and a second insulating material 162. The second insulating material 162 can substantially cover the exposed portions of the fourth conductor 156, such as those portions of the fourth conductor 156 that are not covered by the second outer bladder 124. The first insulating material 160 and the second insulating material 162 can be made of the same material, or they can be made of different materials. In one or more arrangements, the first insulating material 160 and the second insulating material 162 can be made of an insulating elastomer. Thus, it will be appreciated that, at least in some instances, the first insulating material 160 and the second insulating material 162 can define exterior surfaces of the actuator.

The actuator 100 can have any suitable size and/or shape. In one or more arrangements, the actuator can have a substantially cylindrical shape overall with a substantially circular cross sectional shape, such as is shown in FIGS. 1-2. It will be understood that other shapes are possible. As used herein, the term "substantially" includes exactly the term it modifies and slight variations therefrom. Thus, the term "substantially circular" means exactly circular and slight variations therefrom. In this particular example, slight variations therefrom can include within normal manufacturing tolerances, within about 10 degrees/percent or less, within about 5 degrees/percent or less, within about 4 degrees/percent or less, within about 3 degrees/percent or less, within about 2 degrees/percent or less, or within about 1 degrees/percent or less.

The actuator 100 can have a non-activated mode and an activated mode. Each of these modes will be described in turn below.

FIG. 1 shows an example of a non-activated mode. In the non-activated mode, power is not supplied to the conductors 150, 152, 154, 156 of the actuator 100. The central fluid chamber 116 and/or the actuator 100 can be in a pinched configuration. "Pinched configuration" means that the actuator and/or the central fluid chamber is pinched, compressed, contracted, and/or that opposing sides or portions of the inner wall of the central fluid chamber are proximate each other from an otherwise neutral position.

The pinched configuration of the central fluid chamber 116 can be due, at least in part, to the strength of the material defining the central bladder 112. Such material tends to contract when not under the influence of any other force. As a result, the dielectric fluid within the central fluid chamber 116 can be squeezed laterally outwardly. In at least some instances, one or more sides of the central fluid chamber 116 can bulge laterally outwardly, as is shown in FIG. 1. Further, the use of the particulate material 140 on the inner surface 115 of the central fluid chamber 116 can facilitate a locking effect on the opposing portions of the inner surface 115.

In the non-activated mode, the first outer fluid chamber 122 and the second outer fluid chamber 128 can be in a neutral state or even a slightly expanded state, which can be due, for example, to the contraction of the central fluid chamber 116.

FIG. 2 shows an example of an activated mode. In the activated mode, power can be supplied to the actuator 100. As a result, the first conductor 150 and the second conductor 152 can become positively charged, and the third conductor 154 and the fourth conductor 156 can become negatively charged. Alternatively, the first conductor 150 and the second conductor 152 can become negatively charged, and the third conductor 154 and the fourth conductor 156 can become positively charged. In one implementation, positively charged electrical energy can be supplied to the first conductor 150 and the second conductor 152, and negatively charged electrical energy can be supplied to the third conductor 154 and the fourth conductor 156. Alternatively, negatively charged electrical energy can supplied to the first conductor 150 and the second conductor 152, and positively charged electrical energy can be supplied to the third conductor 154 and the fourth conductor 156.

Thus, the first conductor 150 and the second conductor 152 are like charged. As a result, the first conductor 150 and the second conductor 152 will tend repel each other, which, in turn, causes the opposing portions of the central fluid chamber 116 to move away from each other. This action can release the pressure on the dielectric fluid 130 within the central fluid chamber 116. Further, the first conductor 150 and the third conductor 154 are oppositely charged. As a result, the first conductor 150 and the third conductor 154 are attracted toward each other. Similarly, the second conductor 152 and the fourth conductor 156 are oppositely charged. As a result, the second conductor 152 and the fourth conductor 156 are attracted toward each other. The attraction between the first conductor 150 and the third conductor 154, as well as the attraction between the second conductor 152 and the fourth conductor 156, may further tend to pull the first conductor 150 and the second conductor 152 to move away from each other. Thus, the central fluid chamber 116 can be in a non-pinched configuration.

The non-pinched configuration can include a neutral condition and/or an expanded condition of the central fluid chamber 116. The central bladder 112 may retract laterally inward. In such case, the sides of the central bladder 112 may no longer bulge laterally outwardly. The first outer fluid chamber 122 and the second outer fluid chamber 128 can be in a pinched configuration. As a result, the dielectric fluid within the first outer fluid chamber 122 and the second outer fluid chamber 128 can be squeezed laterally outwardly. In at least some instances, one or more sides of the first outer fluid chamber 122 and the second outer fluid chamber 128 can bulge laterally outwardly, as is shown in FIG. 2.

When the supply of electrical energy to the actuator 100 is discontinued, the actuator 100 can revert back to the pinched configuration back in FIG. 1. It should be noted that, in at least some instances, the overall height of the actuator 100 can be greater in the activated mode than in the non-activated mode.

Figure 3:
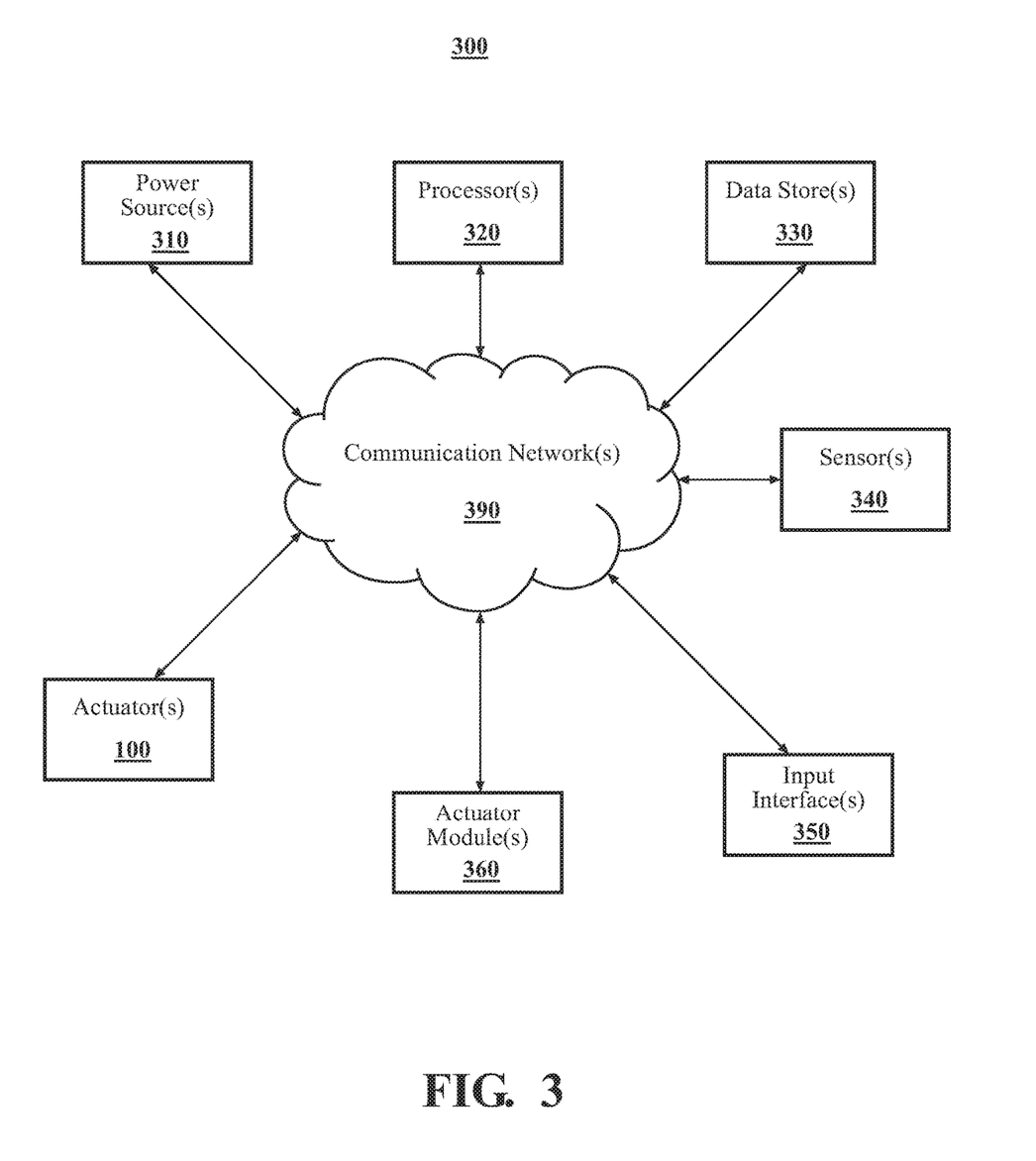
FIG. 3 is an example of an actuator system.

Referring to FIG. 3, a system 300 that includes one or more of the actuators 100 is shown. Some of the possible elements of the system 300 are shown in FIG. 1 and will now be described. The system 300 can include one or more power sources 310, one or more processors 320, one or more data stores 330, one or more sensors 340, one or more input interfaces 350, one or more actuator modules 360, and/or one or more actuators 100. These various components can be operatively connected to each other in any suitable manner.

It will be understood that it is not necessary for the system 300 to have all of the elements shown in FIG. 1 or described herein. The system 300 can have any combination of the various elements shown in FIG. 1. Further, the system 300 can have additional elements to those shown in FIG. 1. In some arrangements, the system 300 may not include one or more of the elements shown in FIG. 1. Further, the elements of the system 300 may be physically separated by large distances. It should be appreciated that although particular elements are separately defined, each or any of the elements or portions thereof may be otherwise combined or segregated via hardware and/or software.

The various components of the system 300 can be communicatively linked through one or more communication networks. As used herein, the term "communicatively linked" can include direct or indirect connections through a communication channel or pathway or another component or system. A "communication network" means one or more components designed to transmit and/or receive information from one source to another. One or more of the elements of the system 300 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further can be implemented as or include one or more wireless networks, whether short or long range. For example, in terms of short range wireless networks, the communication network can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network can include a mobile, cellular, and or satellite-based wireless network and support voice, video, text, and/or any combination thereof. Examples of long range wireless networks can include GSM, TDMA, CDMA, WCDMA networks or the like. The communication network can include wired communication links and/or wireless communication links. The communication network can include any combination of the above networks and/or other types of networks. The communication network can include one or more routers, one or more switches, one or more access points, one or more wireless access points, one or more transmitters, one or more receivers, one or more transceivers, and/or the like.

As noted above, the system 300 can include one or more power sources 310. The power source(s) 310 can be any power source capable of energizing and/or configured to energize the actuator. For example, the power source 310 can include one or more batteries, one or more fuel cells, one or more generators, one or more alternators, one or more solar cells, and combinations thereof. In some arrangements, the power source(s) 310 can be configured to supply positively charged electrical energy and/or negatively charged electrical energy.

The system 300 can include one or more processors 320. "Processor" means any component or group of components that are configured to execute any of the processes described herein or any form of instructions to carry out such processes or cause such processes to be performed. The processor(s) 320 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 320 can include at least one hardware circuit (e.g., an integrated circuit) configured to carry out instructions contained in program code. In arrangements in which there is a plurality of processors 320, such processors can work independently from each other or one or more processors can work in combination with each other.

The processor(s) 320 can be operatively connected to control the flow of electrical energy between the power source(s) 310 and the actuator(s) 100 and/or other element (s) of the system 300. The processor(s) 320 can selectively adjust the flow of electrical energy between the power source(s) 310 and the actuator(s) 100. Control and/or adjustment of the flow of electrical energy can be performed responsive to user inputs (e.g., via the input interface(s) 350)

and/or to automatic inputs (e.g., via the sensor(s) 340, the actuator module(s) 360, etc.).

The system 300 can include one or more data stores 330 for storing one or more types of data. The data store(s) 330 can include volatile and/or non-volatile memory. Examples of suitable data stores 330 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 330 can be a component of the processor(s) 320, or the data store(s) 330 can be operatively connected to the processor(s) 320 for use thereby.

The system 300 can include one or more sensors 340. "Sensor" means any device, component and/or system that can detect, determine, assess, measure, quantify, acquire, and/or sense something, directly or indirectly. The sensor(s) 340 can be configured to detect, determine, assess, measure, quantify and/or sense information in real-time. As used herein, the term "real-time" means a level of processing responsiveness that a user or system senses as sufficiently immediate for a particular process or determination to be made, or that enables the processor to keep up with some external process. In arrangements in which the system 300 includes a plurality of sensors 340, the sensors 340 can work independently from each other or one or more of the sensors can work in combination with each other.

The system 300 can include one or more input interfaces 350. An "input interface" includes any device, component, system, element or arrangement or groups thereof that enable information, data, instructions, and/or commands to be entered into a machine. The input interface(s) 350 can be configured to receive an input from a user. The input interface(s) 350 can include one or more user interface elements, including, for example, keypad(s), display(s), touch screen(s), multi-touch screen(s), button(s), switch(s), dial(s), joystick(s), a mouse/mice, trackball(s), microphone (s), and/or combinations thereof. In one or more arrangements, the input interface(s) 350 can be configured to receive user inputs relating to the actuators(s) 100. In one or more arrangements, the input interface(s) 350 can be configured to receive user inputs relating to the actuator(s) 100 as well as to other things.

The system 300 can include one or more actuators 100 as described above. The one or more actuators 100 can be used for various purposes. In addition to the actuator(s) 100 described herein, the system 300 may also include other types of actuators, such as motors, pneumatic actuators, hydraulic pistons, relays, solenoids, and/or piezoelectric actuators, just to name a few possibilities.

The system 300 can include one or more modules, at least some of which will be described herein. The modules can be implemented as computer readable program code that, when executed by a processor, implement one or more of the various processes described herein. One or more of the modules can be a component of the processor(s) 320, or one or more of the modules can be executed on and/or distributed among other processing systems to which the processor (s) 320 is operatively connected. The modules can include instructions (e.g., program logic) executable by one or more processor(s) 320. Alternatively or in addition, one or more data stores 330 may contain such instructions. In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein.

The system 300 can include one or more actuator modules 360. The actuator module(s) 360 can be configured to detect and/or determine when the actuator(s) 100 should be activated. Such detection and/or determination can be performed based on inputs, conditions, and/or events. As an example, the actuator module(s) can detect inputs on the input interface(s) indicating that activation of the actuator(s) 100. For instance, a user may engage a user interface element dedicated to the actuator(s) 100. Alternatively, the actuator module(s) can determine that the actuator(s) 100 should be activated based on the conditions or events, as detected by one or more of the sensors 340. The actuator module(s) 360 can be configured to control the flow of electrical energy from the power source(s) 310 to the actuator(s) 100.

Now that the various potential systems, devices, elements and/or components have been described, various methods will now be described. Various possible steps of such methods will now be described. The methods described may be applicable to the arrangements described above in relation to FIGS. 1-3 but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 4:
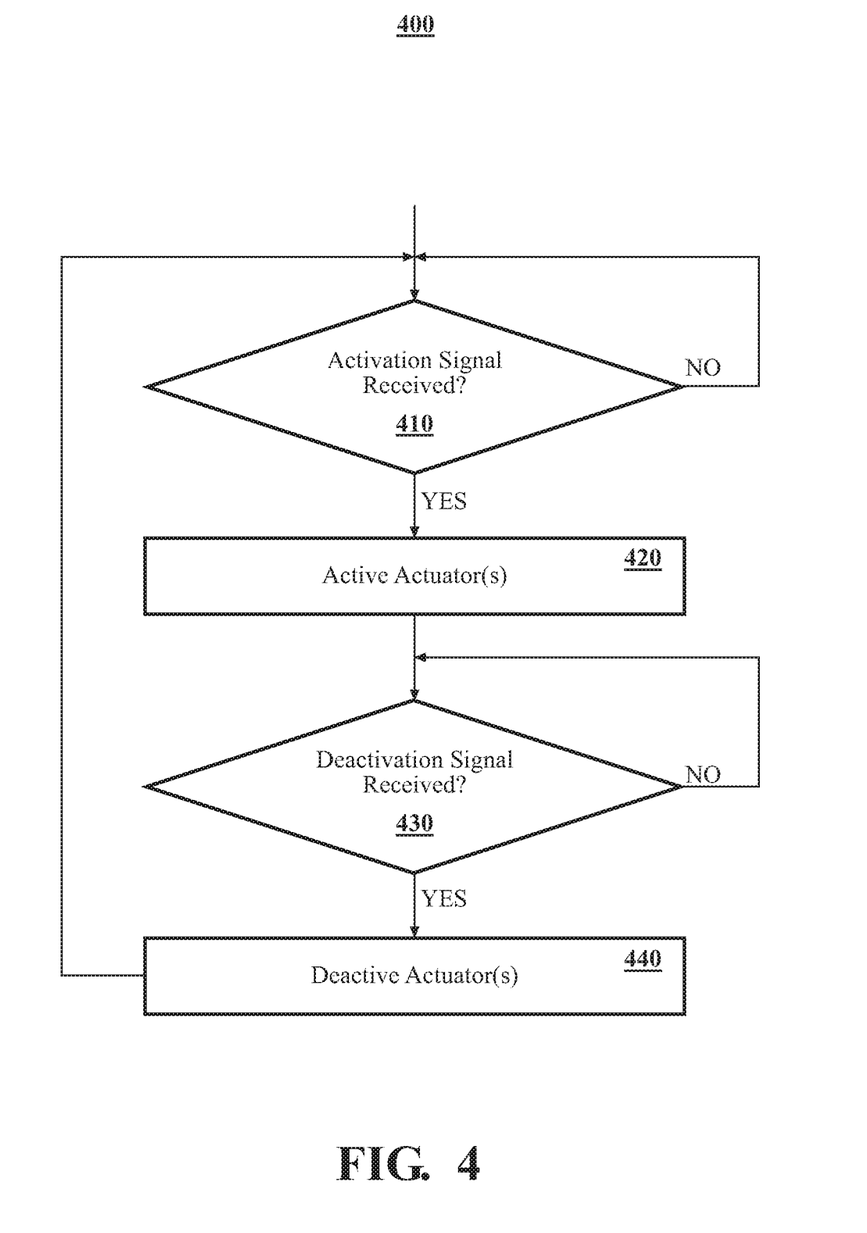
FIG. 4 is an example of a method of using an actuator.

For the sake of discussion, the method 400 can begin with the actuator 100 in a non-activated mode, such as is shown in FIG. 1. In the non-activated mode, electrical energy from the power source(s) 310 is not supplied to the actuator(s) 100. As a result, the central fluid chamber 116 is in a pinched configuration. Generally, the method 400 can include selectively supplying power to one or more actuators 100 to cause the central fluid chamber 116 of the actuator(s) 100 to selectively morph between a pinched configuration in a non-activated mode and a non-pinched configuration in an activated mode.

At block 410, it can be determined whether a signal to activate the actuator 100 has been received. The signal may be generated responsive to a user input, such as on the input interface(s) 350. Alternatively, the signal may be generated responsive to the actuator module(s) 360, the processor(s) 320, and/or one or more sensor(s) 340 detecting an event, condition, or other parameter.

If a signal to activate the actuator 100 is not received, the method 400 can end, return to block 410, or proceed to some other block. However, if a signal to activate the actuator 100 is received, then the method can proceed to block 420. At block 420, the actuator 100 can be activated. Thus, the actuator module(s) 360 and/or the processor(s) 320 can cause the flow of electrical energy from the power sources(s) 310 to the actuator(s) 100.

As a result, the first conductor 150 and the second conductor 152 can become like charged, which causes them to repel each other. This repelling action is further facilitated by the attraction between the first conductor 150 and the third conductor 154 as well as the attraction between the second conductor 152 and the fourth conductor 156 due to their having opposite charges. As a result, the central fluid chamber 116 of the actuator 100 can expand from its non-activated pinched configuration to a non-pinched configuration. In the way of examples, the non-pinched configuration can include a neutral configuration or an expanded configuration, as is shown in FIG. 2. The method can continue to block 430.

At block 430, it can be determined whether a signal to deactivate the actuator 100 has been received. The signal may be generated responsive to a user input, such as on the input interface(s) 350. Alternatively, the signal may be generated responsive to the actuator module(s) 360, the processor(s) 320, and/or one or more sensor(s) 340 detecting an event, condition, or other parameter.

If a signal to deactivate the actuator 100 is not received, the method 400 can end, return to block 430, or proceed to some other block. However, if a signal to deactivate the actuator 100 is received, then the method can proceed to block 440. At block 440, the actuator 100 can be deactivated. Thus, the actuator module(s) 360 and/or the processor(s) 320 can cause the flow of electrical energy from the power sources(s) 310 to the actuator(s) 100 to be discontinued.

The method 400 can end. Alternatively, the method 400 can return to block 410 or some other block.

Actuators described herein can be used in various applications, including in vehicular and non-vehicular applications. It will be appreciated that arrangements described herein can provide numerous benefits, including one or more of the benefits mentioned herein. For example, arrangements described herein can providing an actuator with a central fluid chamber that is normally in a pinched configuration. Thus, power does not need to be supplied to the actuator to attain and maintain the pinched configuration, thereby saving energy.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. An actuator comprising:
   a central bladder, the central bladder including a flexible casing and defining a central fluid chamber, the central fluid chamber including a dielectric fluid;
   a first conductor operatively connected to a first portion of the central bladder; and
   a second conductor operatively connected to a second portion of the central bladder opposite the first portion, the first conductor and the second conductor being operatively connected to receive electrical energy from a power source,
   the actuator being configured such that the central bladder is in a pinched configuration in at least a region located between the first and second conductors when in a non-activated mode in which electrical energy is not supplied to the first and second conductors, and the actuator being configured such that the central bladder is in a non-pinched configuration in at least the region located between the first and second conductors when in an activated mode in which electrical energy is supplied to the first and second conductors.

2. An actuator comprising:
   a central bladder, the central bladder including a flexible casing and defining a central fluid chamber, the central fluid chamber including a dielectric fluid;
   a first conductor operatively connected to a first portion of the central bladder;
   a second conductor operatively connected to a second portion of the central bladder opposite the first portion, the first conductor and the second conductor being operatively connected to receive electrical energy from a power source;
   a first outer bladder, the first outer bladder including a flexible casing and defining a first outer fluid chamber, the first outer fluid chamber including a dielectric fluid; and
   a third conductor operatively connected to a first portion of the first outer bladder,
   the first conductor being operatively connected to a second portion of the first outer bladder, the second portion being opposite the first portion, and
   the actuator being configured such that the central bladder is in a pinched configuration in a non-activated mode in which electrical energy is not supplied to the first and second conductors, and the actuator being configured such that the central bladder is in a non-pinched configuration in an activated mode in which electrical energy is supplied to the first and second conductors.

3. The actuator of claim 2, further including:
   a second outer bladder, wherein the second outer bladder includes a flexible casing and defines a second outer fluid chamber, wherein the second outer fluid chamber includes a dielectric fluid; and
   a fourth conductor operatively connected to a first portion of the second outer bladder,
   wherein the second conductor is operatively connected to a second portion of the second outer bladder, the second portion being opposite the first portion, the first outer bladder and the second outer bladder being located on opposite portions of the central bladder.

4. The actuator of claim 3, wherein the flexible casing of the central bladder is made of a higher strength material than the flexible casing of the first outer bladder and the flexible casing of the second outer bladder.

5. The actuator of claim 3, wherein the flexible casing of the central bladder, the flexible casing of the first outer bladder, and the flexible casing of the second outer bladder are made of an insulating elastomer.

6. An actuator comprising:
   a central bladder, the central bladder including a flexible casing and defining a central fluid chamber, the central fluid chamber including a dielectric fluid;
   a first conductor operatively connected to a first portion of the central bladder; and
   a second conductor operatively connected to a second portion of the central bladder opposite the first portion, the first conductor and the second conductor being operatively connected to receive electrical energy from a power source,
   the actuator being configured such that the central bladder is in a pinched configuration in a non-activated mode in which electrical energy is not supplied to the first and second conductors, and the actuator being configured such that the central bladder is in a non-pinched configuration in an activated mode in which electrical energy is supplied to the first and second conductors, and
   the central fluid chamber including a particulate material, whereby the particulate material facilitates the central bladder being in the pinched configuration in the non-activated mode.

7. The actuator of claim 6, wherein the particulate material is at least partially embedded in the flexible casing of the central bladder.

8. A system comprising:
   an actuator including:
      a central bladder, the central bladder including a flexible casing and defining a central fluid chamber, the central fluid chamber including a dielectric fluid; and
      a first conductor and a second conductor operatively positioned on opposite portions of central bladder;
   a power source operatively connected to supply electrical energy to the first conductor and the second conductor; and
   one or more processors operatively connected to selectively control a supply of electrical energy from the power source to the actuator,
   the actuator being configured such that the central bladder is in a pinched configuration in at least a region located between the first and second conductors when in a non-activated mode in which electrical energy from the power source is not supplied to the first and second conductors, and the actuator being configured such that the central bladder is in a non-pinched configuration in at least the region located between the first and second conductors when in an activated mode in which electrical energy is supplied to the first and second conductors.

9. The system of claim 8, further including an input interface, whereby the supply of electrical energy from the power source to the actuator is controllable by inputs received via the input interface.

10. A system comprising:
    an actuator including:
       a central bladder, the central bladder including a flexible casing and defining a central fluid chamber, the central fluid chamber including a dielectric fluid; and
       a first conductor and a second conductor operatively positioned on opposite portions of central bladder;
    a power source operatively connected to supply electrical energy to the first conductor and the second conductor; and one or more processors operatively connected to selectively control a supply of electrical energy from the power source to the actuator, the actuator being configured such that the central bladder is in a pinched configuration in a non-activated mode in which electrical energy from the power source is not supplied to the first and second conductors, and the actuator being configured such that the central bladder is in a non-pinched configuration in an activated mode in which electrical energy is supplied to the first and second conductors the power source supplying electrical energy to the first and second conductors such that the first and second conductors have like charges, whereby the first and second conductors repel each other in the activated mode.

11. A system comprising:
an actuator including:
    a central bladder, the central bladder including a flexible casing and defining a central fluid chamber, the central fluid chamber including a dielectric fluid; and
    a first conductor and a second conductor operatively positioned on opposite portions of central bladder;
a power source operatively connected to supply electrical energy to the first conductor and the second conductor;
one or more processors operatively connected to selectively control a supply of electrical energy from the power source to the actuator,
the actuator being configured such that the central bladder is in a pinched configuration in a non-activated mode in which electrical energy from the power source is not supplied to the first and second conductors, and the actuator being configured such that the central bladder is in a non-pinched configuration in an activated mode in which electrical energy is supplied to the first and second conductors; and
one or more sensors operatively connected to the one or more processors, whereby the supply of electrical energy from the power source to the actuator is controllable based on sensor data acquired by the one or more sensors.

12. A system comprising:
an actuator including:
    a central bladder, the central bladder including a flexible casing and defining a central fluid chamber, the central fluid chamber including a dielectric fluid; and
    a first conductor and a second conductor operatively positioned on opposite portions of central bladder;
    a first outer bladder, wherein the first outer bladder includes a flexible casing and defines a first outer fluid chamber, wherein the first outer fluid chamber includes a dielectric fluid; and
    a third conductor, wherein the third conductor and the first conductor are operatively positioned on opposite portions of first outer bladder,
a power source operatively connected to supply electrical energy to the first conductor and the second conductor; and
one or more processors operatively connected to selectively control a supply of electrical energy from the power source to the actuator,
the actuator being configured such that the central bladder is in a pinched configuration in a non-activated mode in which electrical energy from the power source is not supplied to the first and second conductors, and the actuator being configured such that the central bladder is in a non-pinched configuration in an activated mode in which electrical energy is supplied to the first and second conductors, the power source supplying electrical energy to the third conductor such that the first conductor and the third conductor have opposite charges, whereby the first conductor and the third conductor attract each other in the activated mode.

13. The system of claim 12, further including:
a second outer bladder, wherein the second outer bladder includes a flexible casing and defines a second outer fluid chamber, wherein the second outer fluid chamber includes a dielectric fluid; and
a fourth conductor, wherein the fourth conductor and the second conductor are operatively positioned on opposite portions of the second outer bladder,
wherein the power source supplies electrical energy to the fourth conductor such that the second conductor and the fourth conductor have opposite charges, whereby the second conductor and the fourth conductor attract each other in the activated mode,
wherein the first outer bladder and the second outer bladder are located on opposite portions of the central bladder.

14. The system of claim 13, wherein the flexible casing of the central bladder is made of a higher strength material than the flexible casing of the first outer bladder and the flexible casing of the second outer bladder.

15. The system of claim 12, wherein the actuator further includes a particulate material at least partially embedded in the flexible casing of the central bladder.

16. An actuator comprising:
a central bladder, the central bladder including a flexible casing and defining a central fluid chamber, the central fluid chamber including a dielectric fluid;
a first conductor operatively connected to a first portion of the central bladder;
a second conductor operatively connected to a second portion of the central bladder opposite the first portion, the first and second conductors being separated by the central bladder, the first conductor and the second conductor being operatively connected to receive electrical energy from a power source;
a first outer bladder, the first outer bladder including a flexible casing and defining a first outer fluid chamber, the first outer fluid chamber including a dielectric fluid;
a third conductor operatively connected to a first portion of the first outer bladder, the first conductor being operatively connected to a second portion of the first outer bladder opposite the first portion, the first conductor and the third conductor being separated by the first outer bladder;
a second outer bladder, the second outer bladder including a flexible casing and defining a second outer fluid chamber, the second outer fluid chamber including a dielectric fluid; and
a fourth conductor operatively connected to a first portion of the second outer bladder, the second conductor being operatively connected to a second portion of the second outer bladder opposite the first portion, the second conductor and the fourth conductor being separated by the second outer bladder,
the first outer bladder and the second outer bladder being located on opposite portions of the central bladder.

17. The actuator of claim 16, wherein the actuator being configured such that the central bladder is in a pinched configuration in a non-activated mode in which electrical energy is not supplied to the first and second conductors, and the actuator being configured such that the central bladder is in a non-pinched configuration in an activated mode in which electrical energy is supplied to the first and second conductors.

18. The actuator of claim 17, further including a particulate material, wherein the particulate material is at least partially embedded in the flexible casing of the central bladder, whereby the particulate material facilitates the central bladder being in the pinched configuration in the non-activated mode.

19. The actuator of claim 16, further including an insulating material substantially covering exposed portions of the third conductor and the fourth conductor.

20. The actuator of claim 16, wherein the flexible casing of the central bladder is made of a higher strength material than the flexible casing of the first outer bladder and the flexible casing of the second outer bladder.

* * * * *